US 8,983,649 B2

(12) United States Patent
Checketts et al.

(10) Patent No.: US 8,983,649 B2
(45) Date of Patent: Mar. 17, 2015

(54) AUTOMATED STORAGE SYSTEM AND TRANSPORT VEHICLE

(75) Inventors: Stanley J. Checketts, Providence, UT (US); Stott Barwick, Smithfield, UT (US); Merin Swasey, North Logan, UT (US)

(73) Assignee: Boomerang Systems, Inc., Morristown, NJ (US)

( * ) Notice: Subject to any disclaimer, the term of this patent is extended or adjusted under 35 U.S.C. 154(b) by 1449 days.

(21) Appl. No.: 12/688,813

(22) Filed: Jan. 15, 2010

(65) Prior Publication Data

US 2010/0183409 A1 Jul. 22, 2010

Related U.S. Application Data

(60) Provisional application No. 61/258,006, filed on Nov. 4, 2009, provisional application No. 61/248,448, filed on Oct. 3, 2009, provisional application No. 61/145,543, filed on Jan. 17, 2009.

(51) Int. Cl.
*G06F 7/00* (2006.01)
*G05D 1/02* (2006.01)
*B60K 17/30* (2006.01)
(Continued)

(52) U.S. Cl.
CPC ............ *G05D 1/0265* (2013.01); *B60K 17/30* (2013.01); *B62D 5/0418* (2013.01); *B62D 7/026* (2013.01); *E04H 6/00* (2013.01); *G05D 1/0297* (2013.01); *G05D 2201/0216* (2013.01)
USPC ............ 700/228; 700/229; 700/230; 700/213

(58) Field of Classification Search
None
See application file for complete search history.

(56) References Cited

U.S. PATENT DOCUMENTS

| 4,773,807 A | 9/1988 | Kroll |
| 4,973,219 A | 11/1990 | Brickner et al. |

(Continued)

FOREIGN PATENT DOCUMENTS

| EP | 1 925 762 | 5/2008 |
| JP | 2002-274250 | 9/2002 |

(Continued)

OTHER PUBLICATIONS

International Search Report with Written Opinion for corresponding International Application No. PCT/US2010/021283, mail date Aug. 17, 2010.

(Continued)

*Primary Examiner* — Yolanda Cumbess
(74) *Attorney, Agent, or Firm* — Graham Curtin, P.A.

(57) ABSTRACT

An automated storage system for vehicles or the like is provided with a guidance system that interacts with a remote-controlled transport system that transports a vehicle between an access location, such a drive-up location, and a storage location. More particularly, in one embodiment, an omni-directional, battery-powered, wirelessly-controlled, transport system or so-called automated guided vehicle ("AGV") is designed to follow magnetic field generating wires and RFID chips on the floors of the parking facility to move forward, backward and side to side underneath cars that are parked on a flat surface. In one embodiment, the AGV automatically contracts and expands its body to slide its arms under the wheelbase of a car, lift the car, and roll with speed and precision in any direction on to a waiting lift, that will then raise and lower the AGV and its automobile payload toward its ultimate destination.

10 Claims, 25 Drawing Sheets

(51) Int. Cl.
*B62D 5/04* (2006.01)
*B62D 7/02* (2006.01)
*E04H 6/00* (2006.01)

(56) References Cited

U.S. PATENT DOCUMENTS

| | | | |
|---|---|---|---|
| 5,111,401 | A | 5/1992 | Everett, Jr. et al. |
| 5,650,703 | A | 7/1997 | Yardley et al. |
| 7,605,688 | B1 * | 10/2009 | Seah ............ 340/425.5 |
| 2006/0290472 | A1 | 12/2006 | Onderko et al. |
| 2007/0065258 | A1 | 3/2007 | Benedict et al. |
| 2007/0156320 | A1 | 7/2007 | Breed et al. |
| 2011/0082588 | A1 * | 4/2011 | McDowell et al. ............ 700/275 |
| 2013/0046406 | A1 * | 2/2013 | Andersen et al. ............. 700/213 |

FOREIGN PATENT DOCUMENTS

| | | |
|---|---|---|
| JP | 2003-321102 | 11/2003 |
| JP | 2005-138883 | 6/2005 |
| JP | 2005-280963 | 10/2005 |
| JP | 2008-546613 | 12/2008 |

OTHER PUBLICATIONS

International Search Report with Written Opinion for related International Application No. PCT/US2010/021285, mail date Sep. 2, 2010.

Non-Final Office Action for U.S. Appl. No. 13/648,821 Mailed Dec. 16, 2013.

* cited by examiner

Exit Checklist

All items must be checked before your vehicle can be stored

☐ All people out of the vehicle & chamber.  ☐ Transmission in gear or Park.

☐ All pets out of the vehicle & chamber.  ☐ Keys Removed

☐ Belongings collected.  ☐ All doors are closed.

☐ Vehicle is turned off.  ☐ Truck/hatch is closed.

BACK   NEXT

FIG. 12

AUTOMATED STORAGE SYSTEM AND TRANSPORT VEHICLE

CROSS-REFERENCE TO RELATED APPLICATIONS

This application claims the benefit of U.S. Application 61/145,543, filed Jan. 17, 2009, U.S. Application 61/248,448, filed Oct. 3, 2009, and U.S. Application 61/258,006, filed Nov. 4, 2009, the contents of each of which are incorporated herein by reference. This application is also related to U.S. Application 60/890,309, filed Feb. 16, 2007, and U.S. application Ser. No. 12/032,671, filed Feb. 16, 2008, the contents of which are incorporated herein by reference.

FIELD OF THE INVENTION

The present invention relates to automated storage systems in general, and more particularly to an automated storage system for the storage of automobiles, for example, and a transport delivery vehicle used for the transport of an automobile, for example, between a storage location and an access location.

BACKGROUND

U.S. Patent Publication 2008/0208389 (the '389 Publication), the contents of which are incorporated by reference herein, describes an automated self storage system based on an integrated cart and caddy system traveling within an open network of support beams. The support beams provide adequate support for storage containers as described in the '389 Publication. However, an open-network, framework-type support structure would have certain drawbacks if other items are being stored, such as automobiles and the like.

Conventional parking garages are transforming the landscape to meet the demand for high capacity storage. In urban centers, where space above and below ground is at a premium, the owner of a parking facility is constrained by a fixed footprint and a certain amount of vertical space extending from such footprint. Multi-level garages can only extend so high without becoming an eyesore or unwieldy to navigate (no one wants to park on the $30^{th}$ floor, for example). Furthermore, self-park and/or attendant-park locations must account for extra space on either side of a vehicle for human access into and out of and around the vehicles.

In addition, each storage location has an associated amount of overhead that must be accommodated by the facility owner. For example, most facilities usually allow more than adequate space in front of each storage location to account for the typical ingress and egress from a spot. Also provided are typical human amenities such as passenger hallways, stairways, elevators, fire escapes, appropriate lighting, and possibly vending machines, bathrooms, office space for onsite personnel, security gates, security cameras, alarm systems and the like. Self park facilities also frequently result in accidental contact between cars due to user error, and create opportunities for thieves, vandals and other undesirables. Accordingly, for each storage location at a given site, there is an associated amount of extra space necessary to accommodate user access and traffic, as well as an associated amount of additional resources directed to human amenities, security and the like.

This level of overhead limits the number of vehicles that can be stored on site and adds considerably to the cost of operating a parking facility. There is a need, therefore, for an automated storage system that overcomes the need for human-related overhead, that is efficient to construct and operate, and that does not require additional space or property necessary to accommodate sporadic human access.

SUMMARY

An automated storage system for vehicles or the like is provided with a guidance system that interacts with a remote-controlled transport system that transports a vehicle between an access location, such as a drive-up location, and a storage location. More particularly, in one embodiment, an omni-directional, battery-powered, wirelessly-controlled, transport system or so-called automated guided vehicle (hereinafter "AGV") is designed to follow embedded wires, magnetic markings and RFID chips on the floors of the parking facility or to use custom software programs and input from myriad types of sensors to recognize fixed and moveable objects as landmarks to move forward, backward and side to side underneath cars that are parked on a flat surface. In one embodiment, the AGV automatically contracts and expands its body to slide its arms under the wheelbase of a car, lift the car, and roll with speed and precision in any direction on to a storage location on the same level, or to a waiting lift that will then raise and lower the AGV and its automobile payload toward its ultimate destination on a different level.

BRIEF DESCRIPTION OF THE DRAWINGS

FIG. 12 illustrates one embodiment of an exit checklist for completion prior to delivering the vehicle to storage.

DESCRIPTION OF PREFERRED EMBODIMENTS

Figure 1:
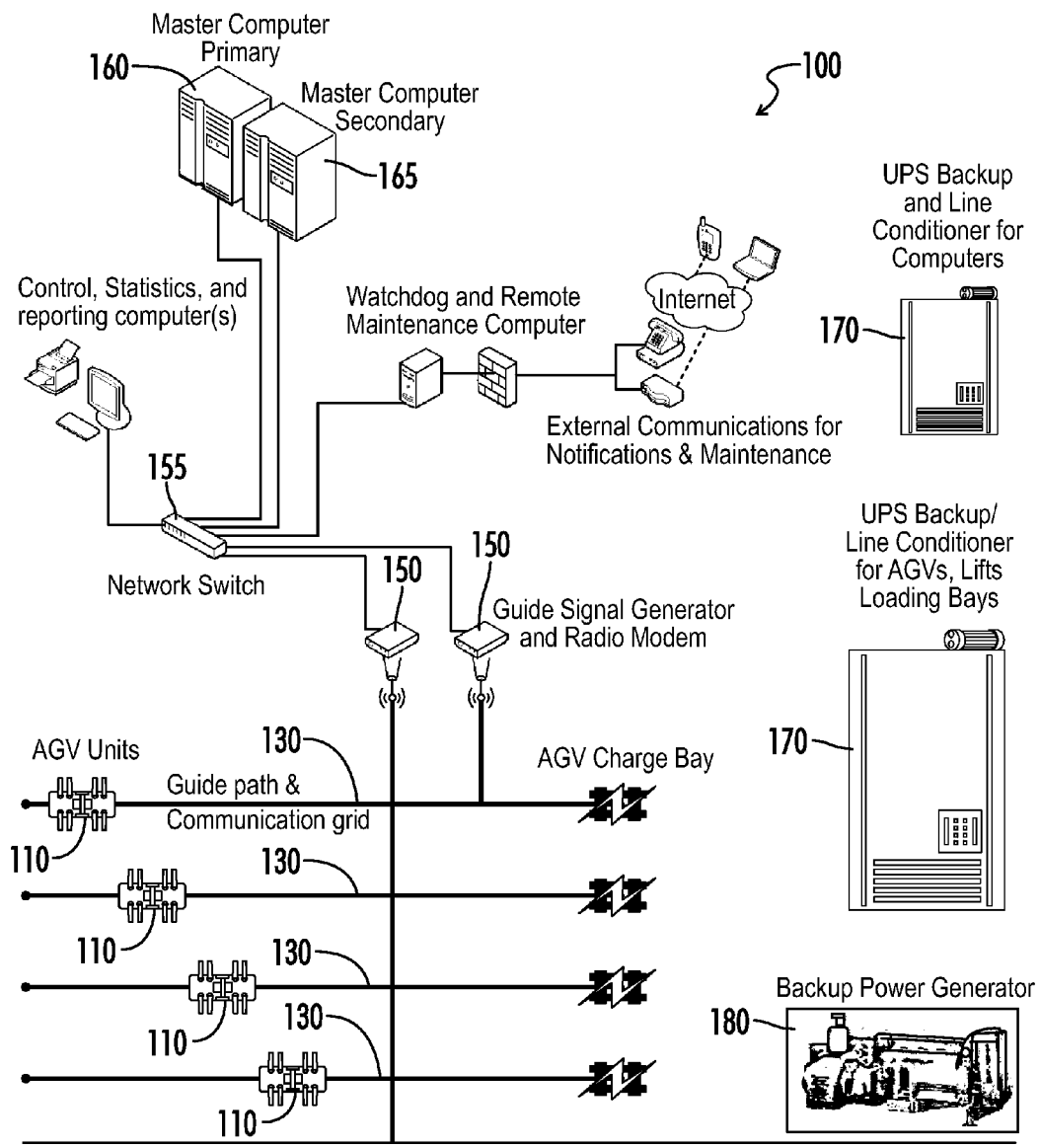
FIG. 1 is a system diagram for one embodiment of an automated storage system of the present invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
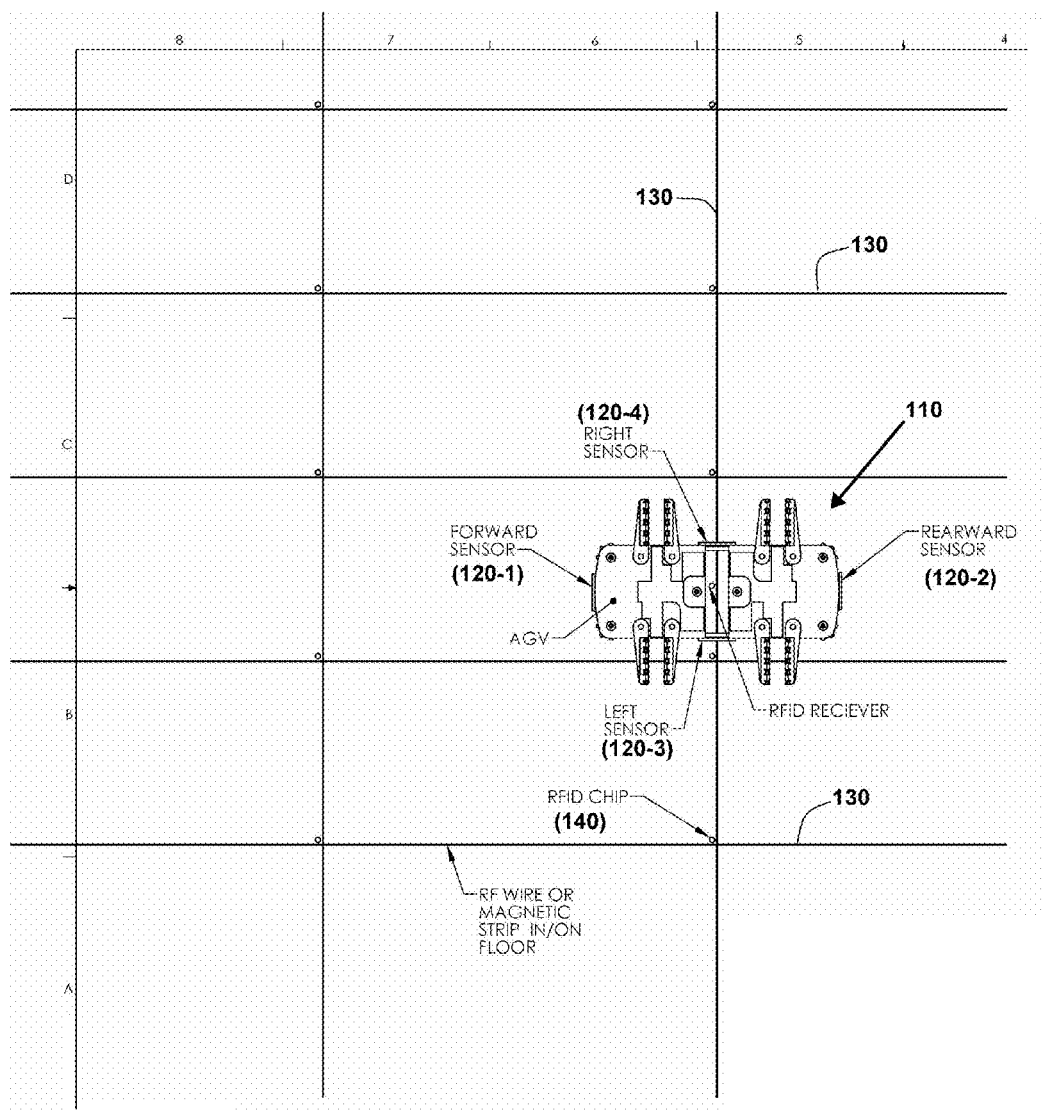
FIG. 2 is a schematic view of a transport vehicle and guidance system suitable for use in an automated storage system of the present invention.

FIG. 1 shows an exemplary and non-limiting diagram of an automated parking system 100 constructed in accordance with one embodiment of the invention. The system 100 locates and tracks the location of transport systems 110 (hereinafter referred to as AGVs) and guides them to parking locations from an access location using, in the illustrated embodiment, radio frequency identification (RFID) and proximity sensing techniques. Specifically, a vehicle (not shown) is mounted on an AGV 110, illustrated also in FIG. 2, which AGV 110 includes a plurality of radio sensors 120-1 through 120-4 (and generally referenced as radio sensor 120) transmitting radio frequency (RF) signals to a radio modem 150. In accordance with a preferred embodiment, the sensors 120 are linear proximity sensors located on all four sides of the AGV 110. The sensors 120-1 and 120-2 at the forward direction and rearward direction respectively keep the AGV 110 aligned along its path by sensing the position of a guide strip 130 in the floor in relation to the center of the AGV 110. The left side and right side sensors 120-3 and 120-4 sense the perpendicular guides enabling the AGV 110 to park the vehicle in its appropriate and designated location. A guide strip 130 may be, for example, a RF wire or magnetic strip. Other guide means are contemplated. As shown in FIG. 2, a guide strip 130 may be placed in both lateral and longitudinal directions to form a grid, and/or it may be laid out to accommodate curved sections as the case may be. The intersection of two guide strips 130 are referred to as storage bays, each of which includes at least a RFID circuit 140 to determine the overall location of the AGV systems 110. To determine the overall location of an AGV, an RFID chip will be used at each storage bay location and along predetermined intervals along pathways. Using these two sensing systems, the facility owner can precisely guide and track the location of each AGV 110. Charge bays are also provided to charge the batteries in the AGV during times of non-use. Other charging means are contemplated.

Referring back to FIG. 1, RF signals generated by the RFID circuits and/or proximity sensors are transmitted to one or more radio modems 150 which output data modulated in the RF signals to a computing device 160. The radio modems 150 and the computing device may be connected in a network established using a network switch 155. The computing device 160 coordinates the proper retrieval and parking (storing) of the vehicle mounted on an AGV 110 from a parking location to an access or retrieval location (i.e., a location where the vehicle is returned to its owner), and vice versa. In order to move an AGV 110 from one location to another, the computing device 160 continuously processes the location information, as transmitted by the proximity sensors 120 and RFID circuits, and generates signals that instruct the AGV 110 to follow a particular direction (i.e., forward, backward, left, right, etc.). The generated signals are wirelessly transmitted by the radio modem 150 to a wireless receiver installed in the AGV 110.

In one embodiment of the invention a user can interface with the system 100 through, for example, a graphical user interface (GUI), an interactive voice response (IVR) interface, a web browser, SMS text messaging, and the like, enabling the user to access information about his/her vehicle, pay for parking and/or other services, check balances, provide retrieval instructions, etc. The user's inputs are processed by the computing device 160. For example, the user may request that his/her car be ready for pick-up at a certain time. The computing device 160 then executes a process for retrieving the vehicle from its parking location to an access location to be ready for the user at the requested time. With this aim, the computing device 160 accesses a database (not shown) used to store the parking location of the vehicle, computes a path from the current location to the access location and communicates the path for the AGV 110 to take to retrieve the vehicle. The computing device 160 also computes the amount due for payments, where payments are made through a payment server (not shown). In one embodiment of the invention, the computing device 160 generates control data and statistical reports, and maintenance and notification alerts. In order to allow continuous operation of the system 100 and to prevent a single point failure, the system 100 includes a redundant computing device 165 for backing up the computing device 160. In certain embodiments, uninterruptible power supplies (UPS) devices 170 and a backup power generator 180 are also utilized in the system 100.

The structural facility usable with the automated storage system of the present invention can vary in size, layout and configuration. The topography must allow for the efficient and effective transport of a vehicle using an AGV as will be described in more detail below. In this regard, the transport surface should preferably be flat to allow the AGV to maneuver between access locations and storage locations. To maximize the efficient use of space in a multi-story location, strategically-positioned elevator-type lifts are employed to transport vehicles from an access floor or tier to a storage floor or tier (see FIG. 9). In a preferred embodiment, the lifts could be protected by guard rails to protect facility members, patrons, fire fighters or emergency medical personnel in the event that humans are required to enter the storage facility. However, guard rails may be omitted if desired or if the environment merits the same. The storage bays are arranged to fit a maximum number of vehicles in a minimum of amount space, while at the same time allowing emergency access to such vehicles if needed. The automated storage system is also able to calculate the amount of storage space required based on a sensory review of the vehicle, which enables a higher density of vehicle storage as compared with a self-park facility that includes a plurality of identically-sized storage locations.

The omni-directional movement of the AGV also allows for unique storage solutions, and greater flexibility in movement is allowed while approaching a storage location and during the extraction therefrom. Traditionally, a sizable turning radius is required when pulling into or exiting from any parking spot. This makes it difficult to position rows of parking spaces in close proximity to each other, particularly in the (longitudinal) direction that is aligned with the parking space. However, with the assistance of omni-directional movement, the AGV is capable of maneuvering into a parking location with very little clearance on all sides.

Figure 3:
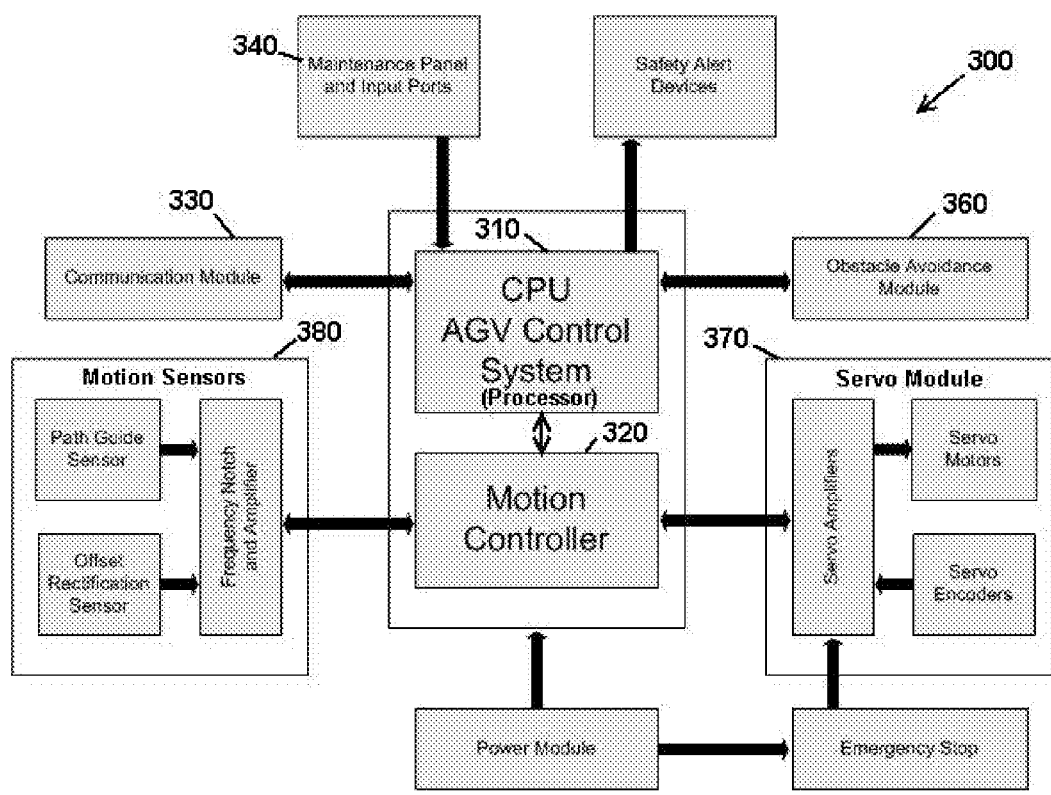
FIG. 3 shows an exemplary and non-limiting block diagram of a control system of an automated parking system and transport vehicle implemented in accordance with an embodiment of the invention.

FIG. 3 shows an exemplary and non-limiting block diagram of a control system 300 of an automated parking system 100 and AGV implemented in accordance with an embodiment of the invention. The control system 300 includes a processor 310 and a motion controller 320 that together control the movement and operation of an AGV 110 within an automated parking system 100. Specifically, the processor 310 is coupled to a communication module 330 adapted to transmit/receive radio signals from/to the computing device 160. In addition, the processor 310 is adapted to process input signals entered through a maintenance panel and input ports 340. An example for such input signal is a RESET signal. The processor 310 is further capable of producing safety alerts 350, for example, based on inputs received from an obstacle avoidance module 360. The motion controller 320 controls the movement of the AGV 110 by generating electric signals to the servo module 370 based on signals received from the motion sensors 380 and the processor 310. In an exemplary embodiment the motion sensors are the proximity sensors.

Figure 4:
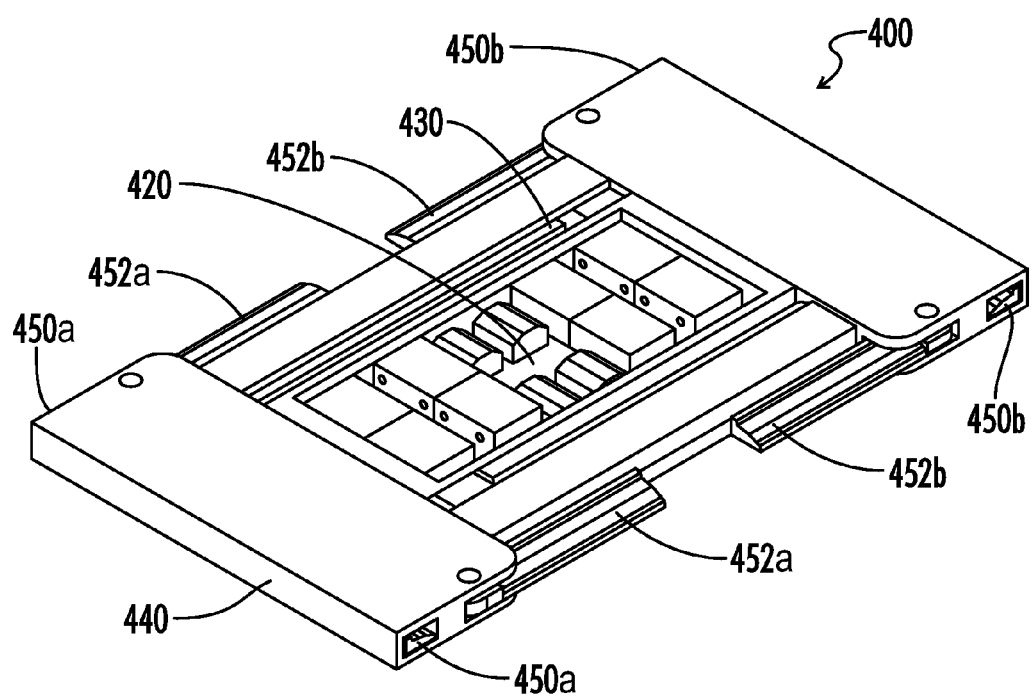
FIG. 4 illustrates a transport vehicle of the present invention in a compacted position.
Figure 5A:
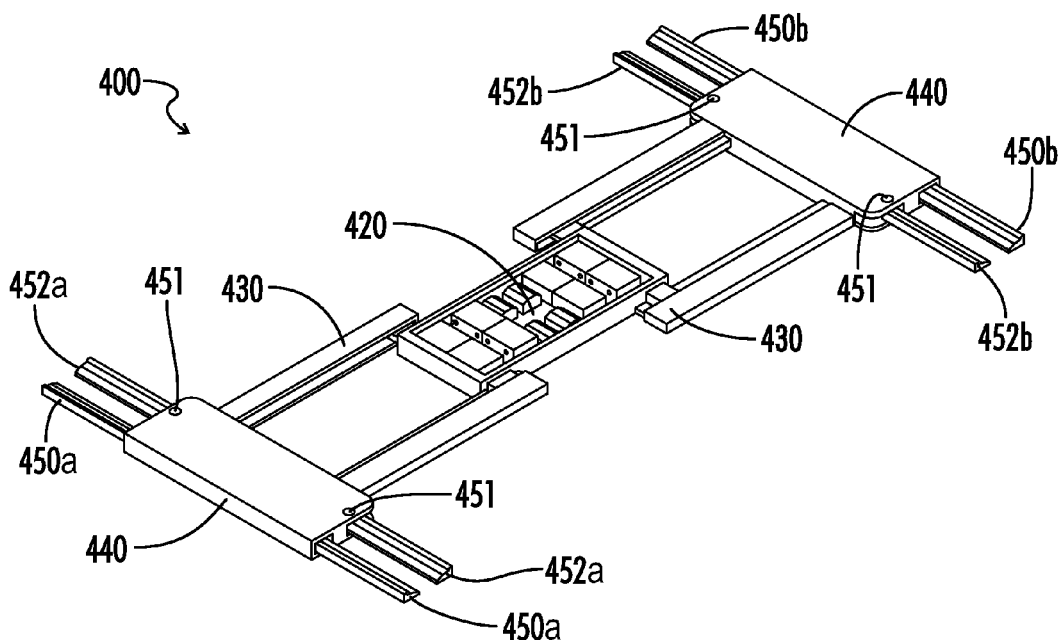
FIG. 5A illustrates one embodiment of a top view of the transport vehicle of FIG. 4 in a fully extended position.
Figure 5B:
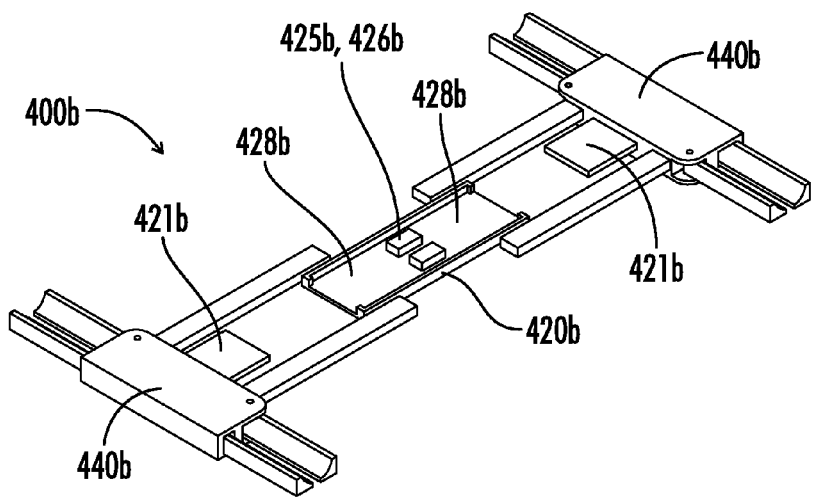
FIG. 5B illustrates one embodiment of a top view of a transport vehicle of the invention in a fully extended position.
Figure 6:
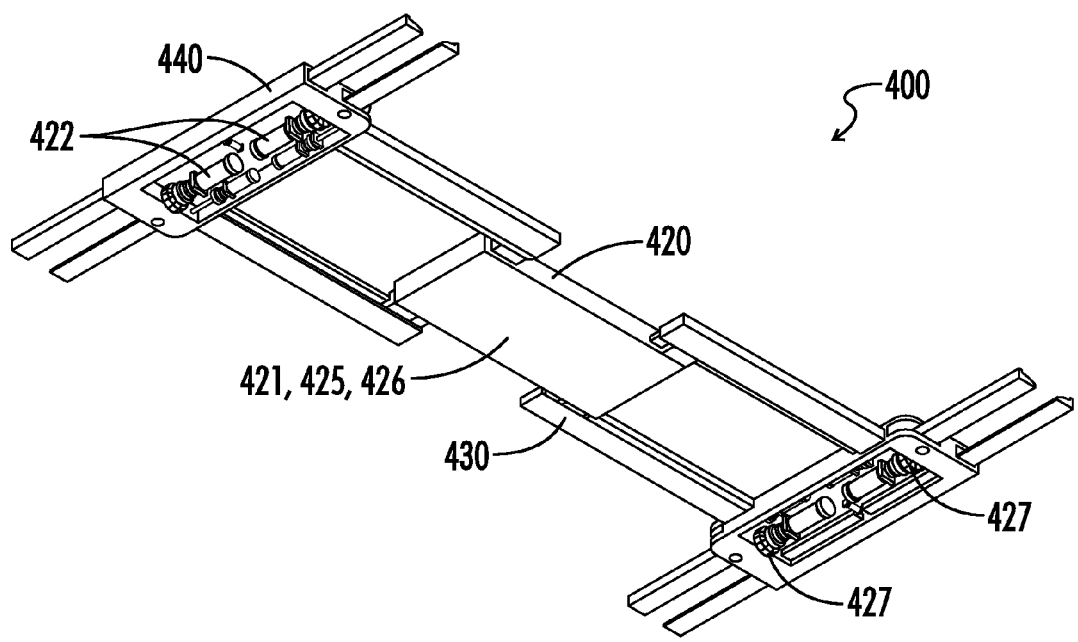
FIG. 6 illustrates a bottom view of the transport vehicle of FIG. 4 in a fully extended position.

One embodiment of an AGV is illustrated in more detail in FIGS. 4-6. The AGV is a programmable, autonomous guided vehicle capable of interacting with a programmable control system and other peripheral components and objects such as hoists, turntables, doors, input devices, racking systems, gates, displays and structures to form an automated vehicle parking and storage system 100, which can be used to automatically store vehicles such as, but not limited to, passenger automobiles with varying degrees of human interaction, but without requiring direct human control of movements, processes or guidance.

In one embodiment illustrated in FIGS. 4-6, an AGV 400 comprises a central housing 420, motor housings 440 positioned at each end of the central housing 420, which motor housings 440 are each connected to the central housing 420 by a pair of guide rails 430. The AGV 400 also contains within its housings a rechargeable power supply 421, drive devices 422, lift devices 423 (not shown), sensors 424 (see FIG. 2, 120-$x$), wireless communications devices 425, control systems 426 and multidirectional wheels or steering tires 427, which allow the AGV 400 to travel, lift, carry and deposit items without physical external connections or direct human intervention. Preferably through the use of short ball screws powered by servo motors, the AGV arms are capable of lifting cars smoothly without the use of bulky, costly, and less-reliable hydraulics. The motor housings 440 can extend away from the central housing 420, or be withdrawn towards it, along guide rails 430. FIGS. 5A and 6 show one embodiment where the power supply 421, communication devices 425 and control systems 426 are housed within the central housing 420, which remains stationary when the motor housings 440 extend away therefrom.

However, other configurations are possible. For example, FIG. 5b illustrates an alternative embodiment of an AGV 400b comprising a central housing 420b and motor housings 440b with power supplies 421b attached to the motor housings 440b instead of the central housing as shown in FIGS. 5A and 6. In FIG. 5b, the central housing 420b includes wireless communications devices 425b and control systems 426b, for example, and openings 428b to accommodate the slidable positioning of the power supplies 421b when the motor housings 440b are moved relative to the central housing 420b. In the retracted position (not shown), the power supplies 421b are situated within the central housing 420b, while in the extended position (FIG. 5b), the power supplies 421b are slidably removed from the central housing 420b and move with the motor housings 440b. The spread-apart positioning of the power supplies 421b when the AGV 400b is in the extended position is useful for load balancing as the power supplies 421b tend to be heavy and positioning heavier items at the ends of the AGV 400b tends to prevent excessive downward displacement of the central housing 420, which might interfere with the movement of the AGV 400b if faced with a ground obstruction or the like.

Returning now to FIGS. 5A and 6, on each side of both motor housings 440, are outer gripper arms 450a, 450b and inner gripper arms 452a, 452b, which are able to be extended or withdrawn as needed, and which are used to securely grab the tires of a vehicle (not shown) such as an automobile, and are able to then hold that vehicle as it is lifted, moved, and set down as needed during operations. More specifically, the outer gripping arms 450a, 450b extend outwardly from the motor housing 440 in a direction that is perpendicular to the longitudinal axis of the AGV 400, while the inner gripping arms 452a, 452b extend angularly around a pivot point 451 from a position aligned with the guide rails 430 as shown in FIG. 4, to a position that is parallel to the outwardly extended outer gripping arms 450a, 450b as shown in FIGS. 5-6. As will be shown, the AGV 400 can position its central housing 420, motor housings 440, guide rails 430 and gripping arms 450a, 450b, 452a, 452b independently in order to assume an almost infinite number of positional configurations relative to a vehicle and its surroundings.

The AGV 400 can in general be described during operations to be in one of five positional modes, namely (1) Compact Movement, (2) Extending, (3) Extended Not Loaded, (4) Extended Loaded, or (5) Contracting. In one embodiment of a typical application, illustrated in part with reference to the example shown in FIGS. 7A-7G, the AGV 400 may begin an operational cycle by independently approaching an automobile (or the like) 500, having a pair of rear tires 520 and a pair of front tires 540, positioned within a designated area and indicated by any of a variety of means as ready for storage. At this point, the AGV 400 will be in Compact Movement mode as illustrated in FIG. 4. After determining precisely its relative position to the automobile 500, the AGV 400 will pass safely between the automobile tires from either side, from in front, or from behind the automobile, to a position directly beneath the approximate center of the automobile undercarriage. In the example shown in FIGS. 7A-7G, the AGV 400 approaches the vehicle 500 from the front. Once in this position, or depending upon the exact operational circumstances, while moving into this position, the AGV 400 will use on board sensors to determine the exact position of the tires of the vehicle, and begin Extending its motor housings and tire grippers in preparation of securing and lifting the designated vehicle 500. After completing the transition to Extended Not Loaded mode, the AGV 400 will have swung all four sets of tire grippers (total of eight) into position, one in front and one behind each of the tires of the target vehicle.

Figure 7A:
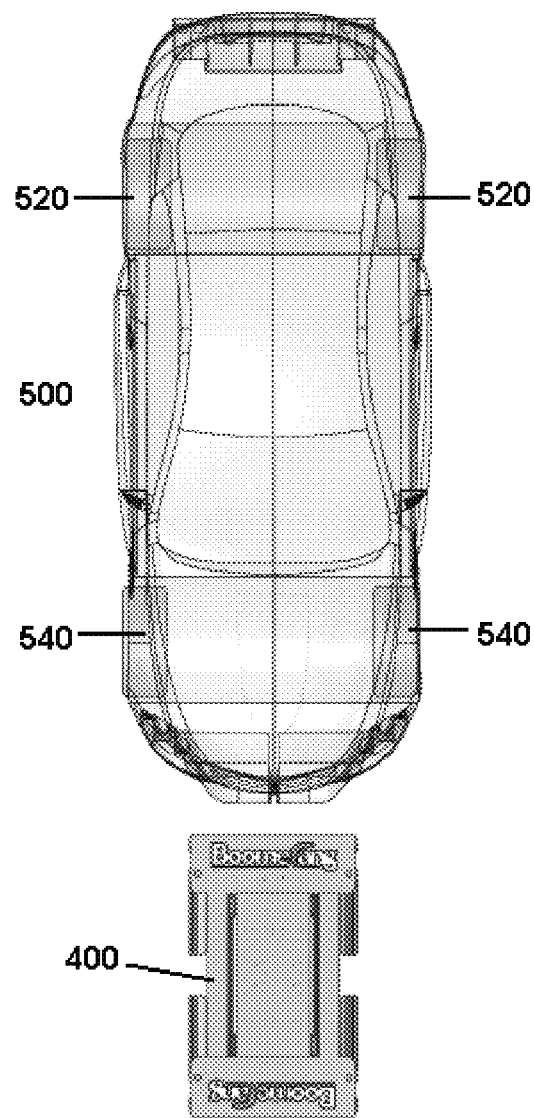
FIGS. 7A-7G illustrate one embodiment of a method of engaging the transport vehicle with an object to be transported.
Figure 7B:
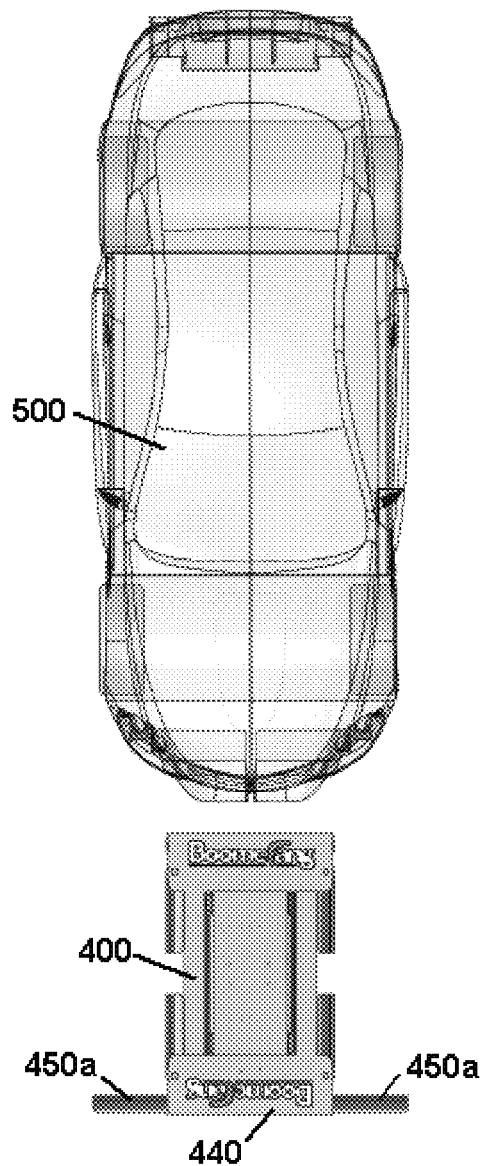
Figure 7C:
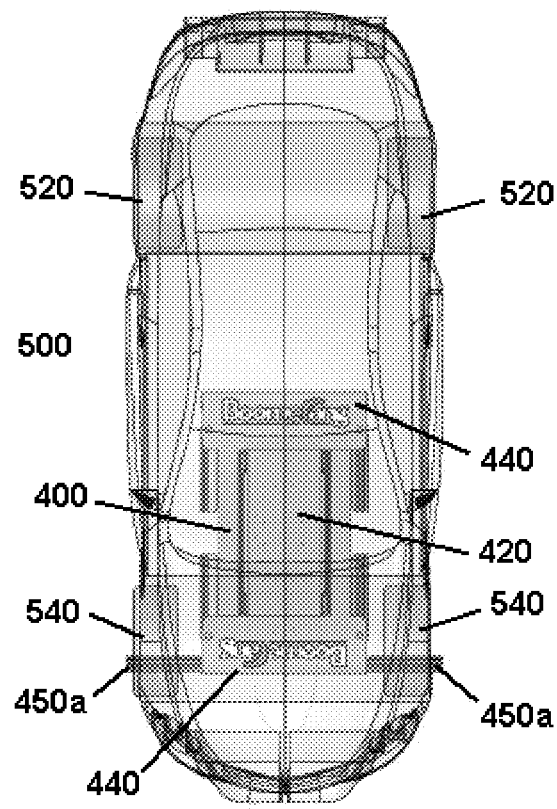
Figure 7D:
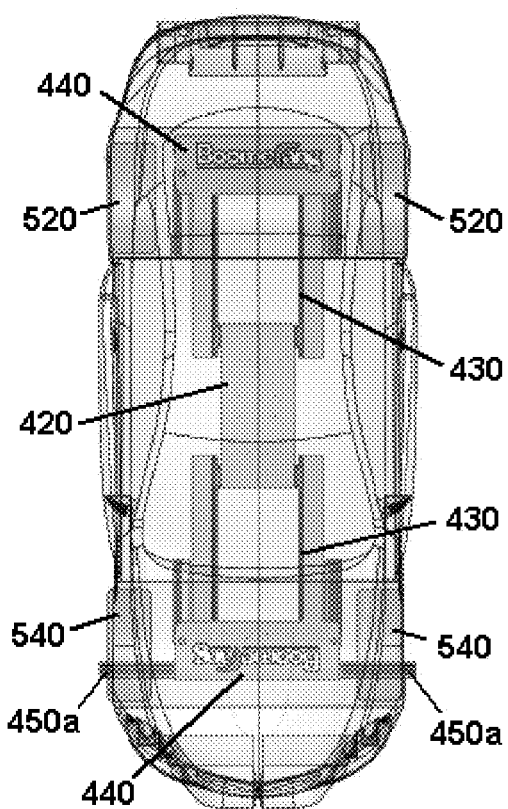
Figure 7E:
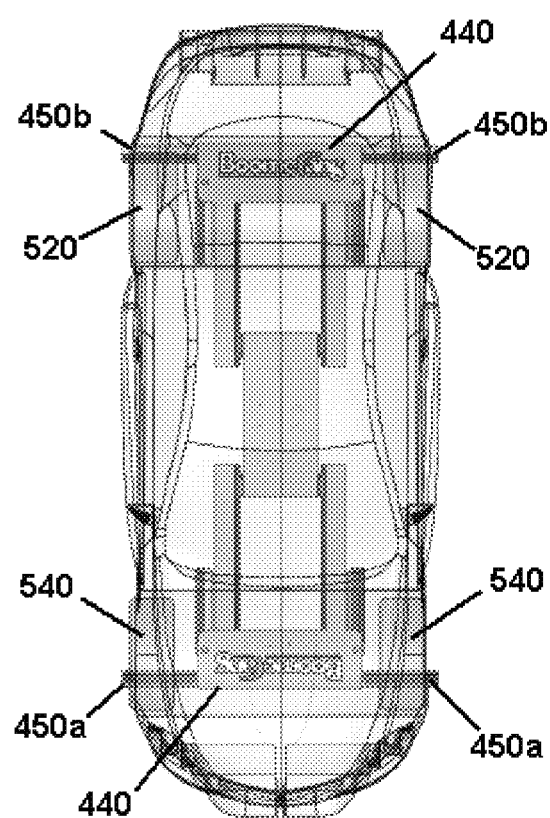
Figure 7F:
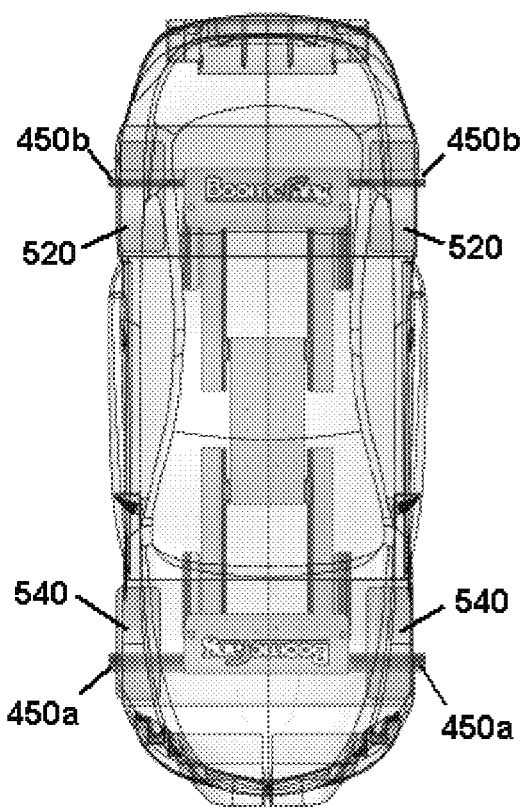
Figure 7G:
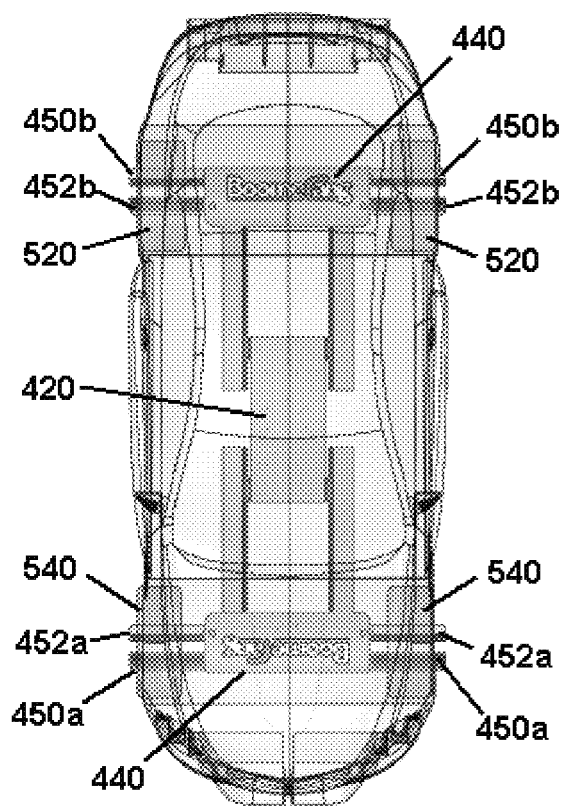

More specifically, in one embodiment shown in FIGS. 7A-7G, showing the engagement of the AGV 400 with a vehicle 500, the AGV 400 approaches a vehicle 500 from the front in the Compact Movement mode (FIG. 7A). Once the forward sensor 120-1 (FIG. 2) senses the AGV 400 it is in proximity to the front tires 540, the rear outer gripping arms 450a extend outwardly from the motor housing 440 (FIG. 7B) while the AGV 400 is approaching the vehicle until the rear outer gripping arms 450a contact the front tires 540 (FIG. 7C). At this point, the AGV 400 enters the Extending mode and the front motor housing 440 extends via guide rails 430 toward the rear tires 520 while the rear outer gripping arms 450a remain anchored against the front tires 540 (FIG. 7D). In the illustrated embodiment, the AGV 400 is designed to extend beyond the rear tires 520 a certain distance before the front outer gripping arms 450b are outwardly extended from the motor housing 440 (FIG. 7E). Thereafter, the AGV 400 enters the Contracting mode until the front outer gripping arms 450b contact or engage the rear tires 520 (FIG. 7F), at which point the rear and front inner gripping arms 452a, 452b engage the opposite sides of the front and rear wheels 540, 520 (FIG. 7G) and the AGV 400 enters the Extended Not Loaded mode.

Figure 7H:
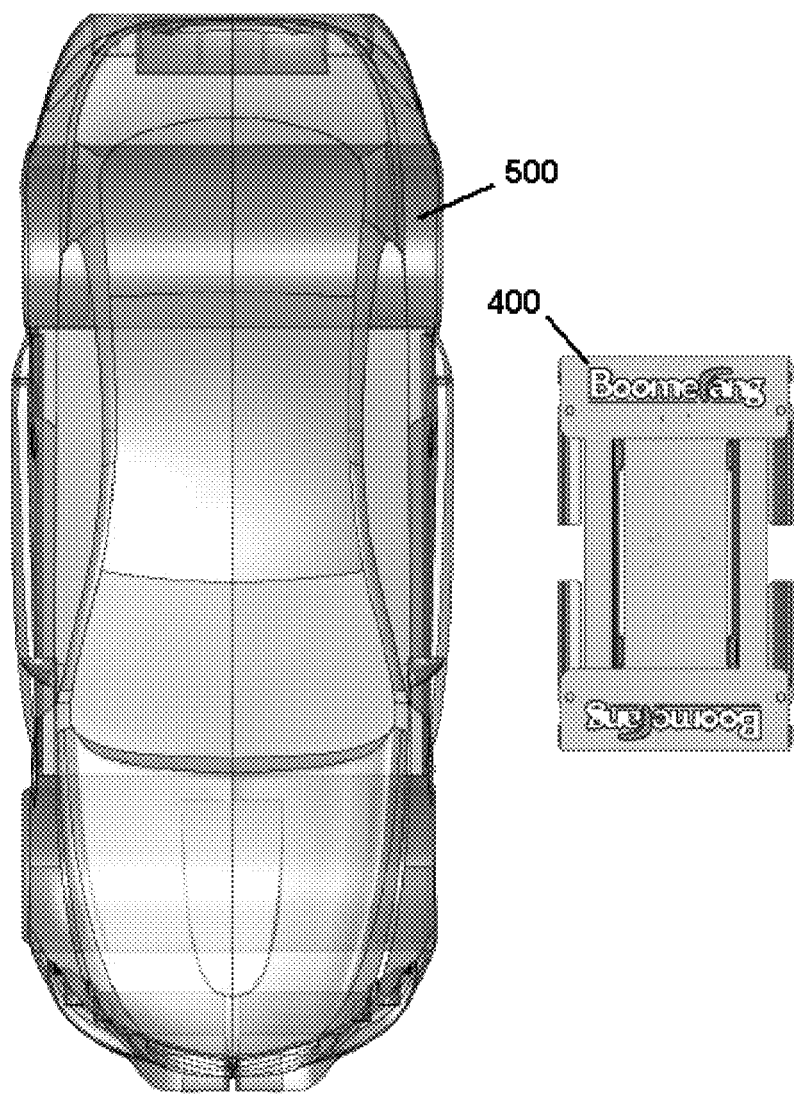
FIGS. 7H-7L illustrate an alternative embodiment of a method of engaging the transport vehicle with an object to be transported.
Figure 7I:
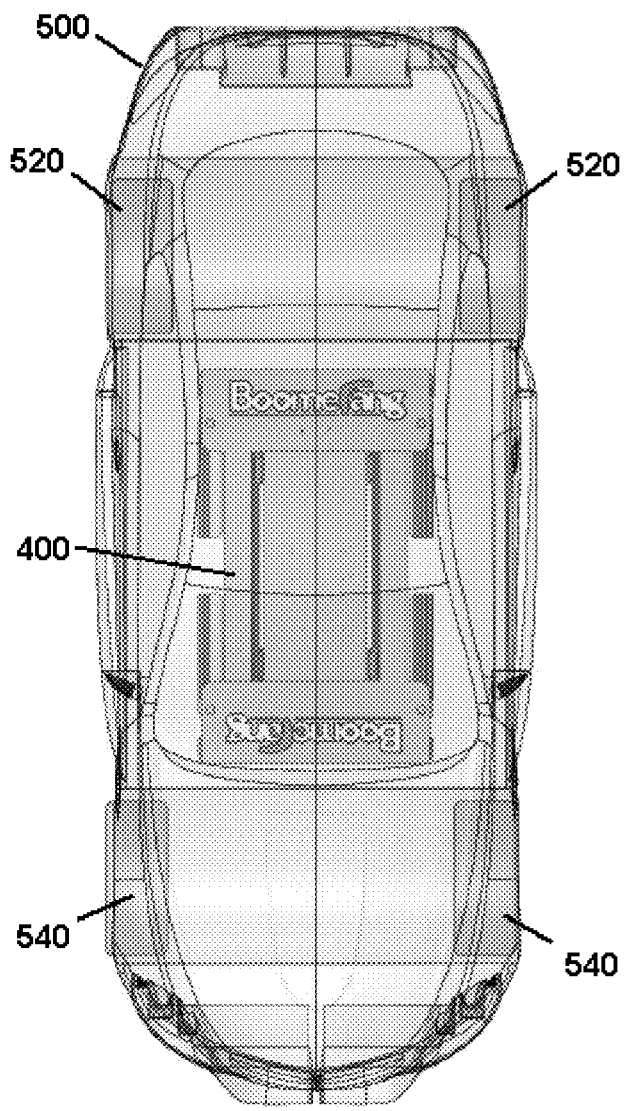
Figure 7J:
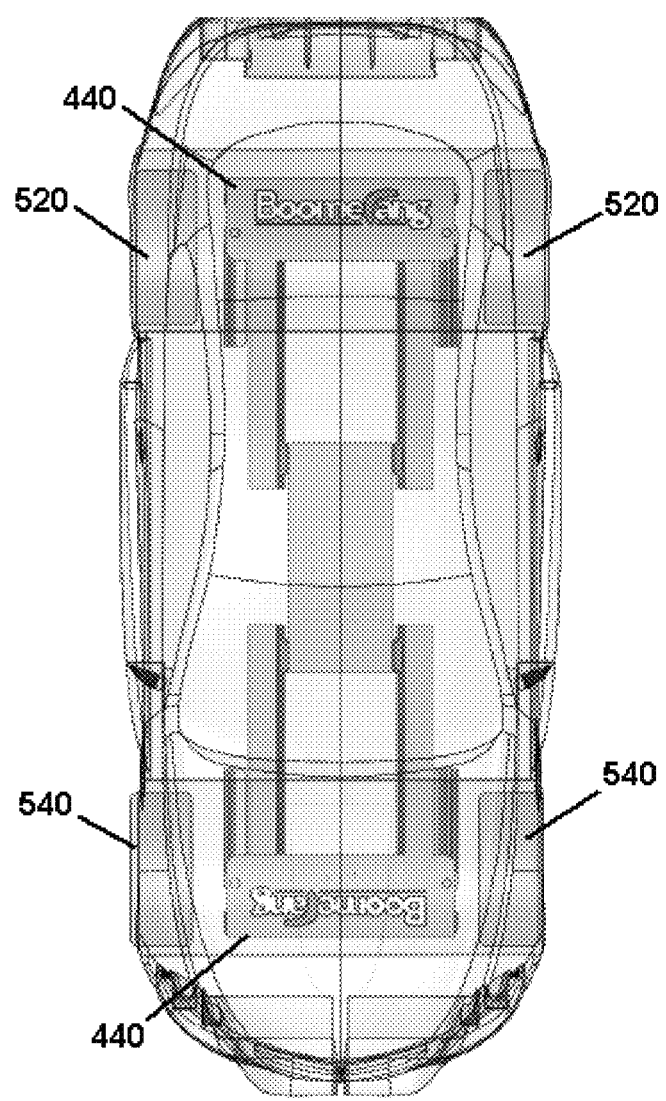
Figure 7K:
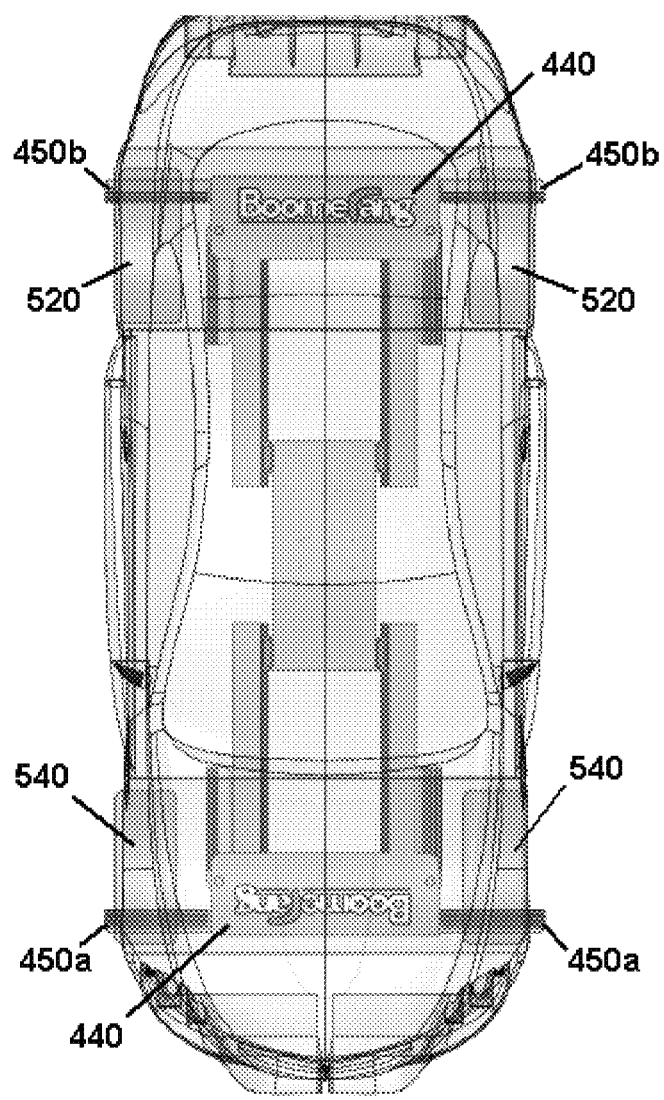
Figure 7L:
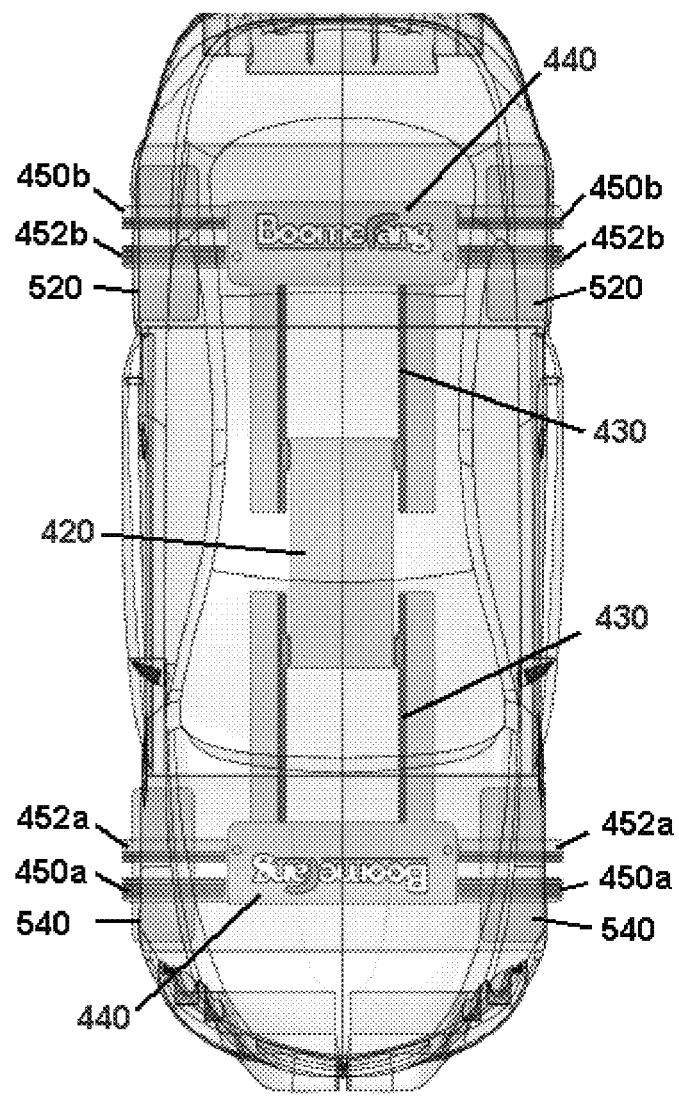

In another embodiment (FIGS. 7H through 7L) showing the engagement of the AGV 400 with a vehicle 500, the AGV 400 approaches the vehicle 500 from the side in the Compact Movement mode (FIG. 7H) and centers itself under the vehicle 500 between the front and rear tires 540, 520 respectively (FIG. 7I). At this point, the AGV 400 enters the Extending mode and the front and rear motor housings 440 extend to a point beyond the front and rear tires 540, 520 until the front and rear sensors 120-1, 120-2 (FIG. 2) senses the AGV 400 is in proximity to the front and rear tires 540, 520 (FIG. 7J), at which point the outer gripping arms 450a, 450b extend outwardly from the motor housings 440 (FIG. 7K). Thereafter, the AGV 400 enters the Contracting mode until the outer gripping arms 450a, 450b contact or engage the tires 540, 520 respectively, at which point the inner gripping arms 452a, 452b pivot outwardly and engage the opposite sides of the front and rear wheels 540, 520 (FIG. 7L) and the AGV 400 enters the Extended Not Loaded mode.

Figure 8:
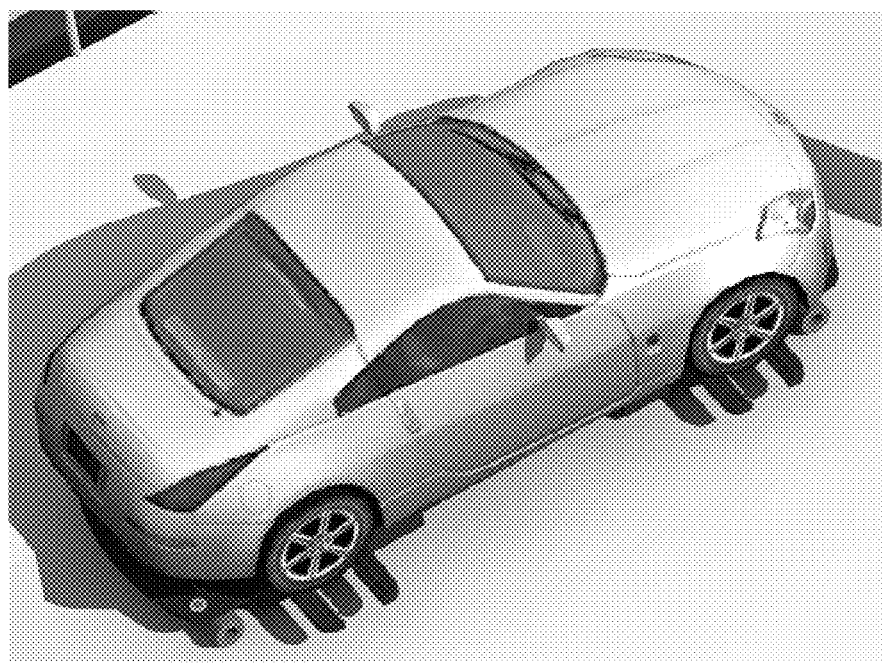
FIG. 8 illustrates an automobile that is engaged for movement by the transport vehicle of the invention.
Figure 9:
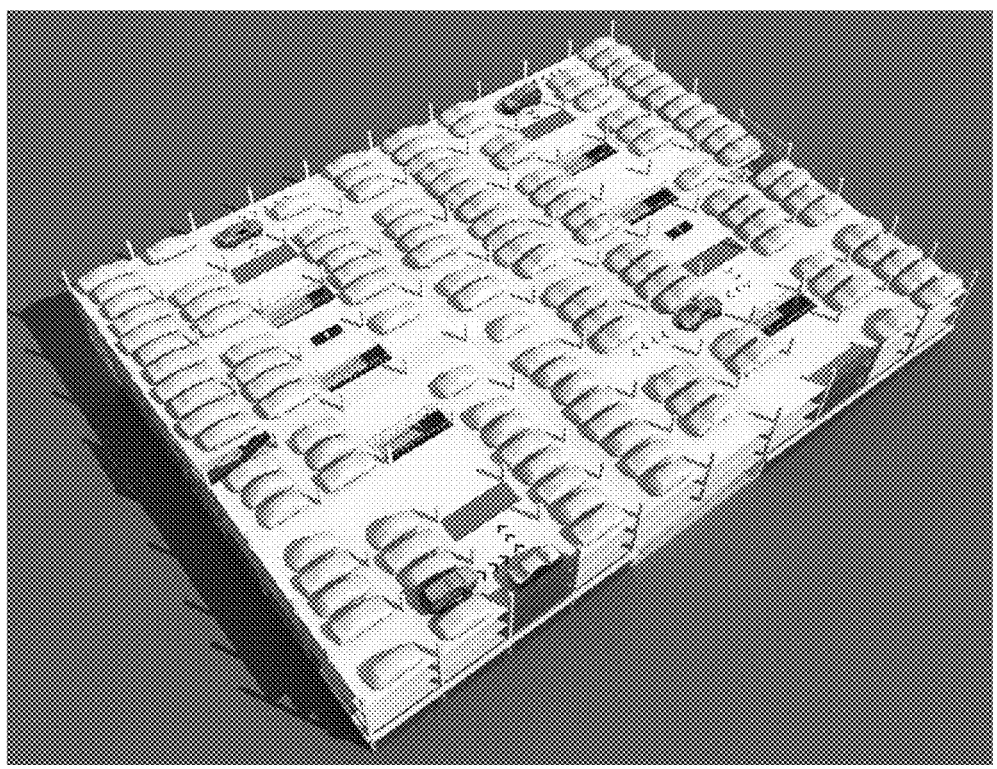
FIG. 9 is a schematic illustration of one embodiment of a facility used with the automated storage system of the invention.

The AGV 400 will then secure the target vehicle 500 with the gripping arms 450a, 450b, 452a, 452b, causing the transition to Extended Loaded mode (FIG. 8). Thereafter, the AGV 400 then lifts the vehicle and secures it on board. The AGV 400 with the target vehicle on board will then proceed to move through and around other system peripherals and structural elements to deliver the target vehicle to a system coordinated storage location (FIG. 9). Once correctly positioned within the designated storage location, the AGV will lower the target vehicle to the storage surface and release its hold on the automobile through the gripping arms, leaving it in Extended Not Loaded mode. Depending upon the exact operational circumstances, the AGV will then retract the gripping arms and motor housings and transition to Compact Movement mode, at which time it can move through the vehicle storage system (FIG. 9) to perform another operation, wait at the current location for another operational request, move to a contact charging pad to recharge its onboard batteries, or move to a staging area to await the next operational request.

Another key function of the AGV is to retrieve previously stored vehicles, through a substantially similar process, and carry them through the storage system and deliver them to a designated vehicle departure or access location. The AGV will then withdraw from the departure area, allowing occupants to enter the vehicle and drive it out of the storage system.

The AGV of the present invention is, in one embodiment, preferably less than three feet wide, five feet long, and under four inches high from the ground. It should be able to engage and lift vehicles in a variety of conditions, such as if the vehicle has a flat tire, for example, or if the ground is wet, muddy, salty, dirty and/or oily, for example. Given its loading position under a vehicle, the AGV should also be able to operate despite fluid leaks, such as oil leaks, transmission fluids and the like in its path without having an adverse impact on its operation. Alternatively, "cleaning robots" could be utilized to remove unwanted objects or clean up oil drippings, mud, salt and the like. The sensors could also be capable of sensing irregular objects in the AGV's path, such as a fallen muffler for example.

Figure 10:
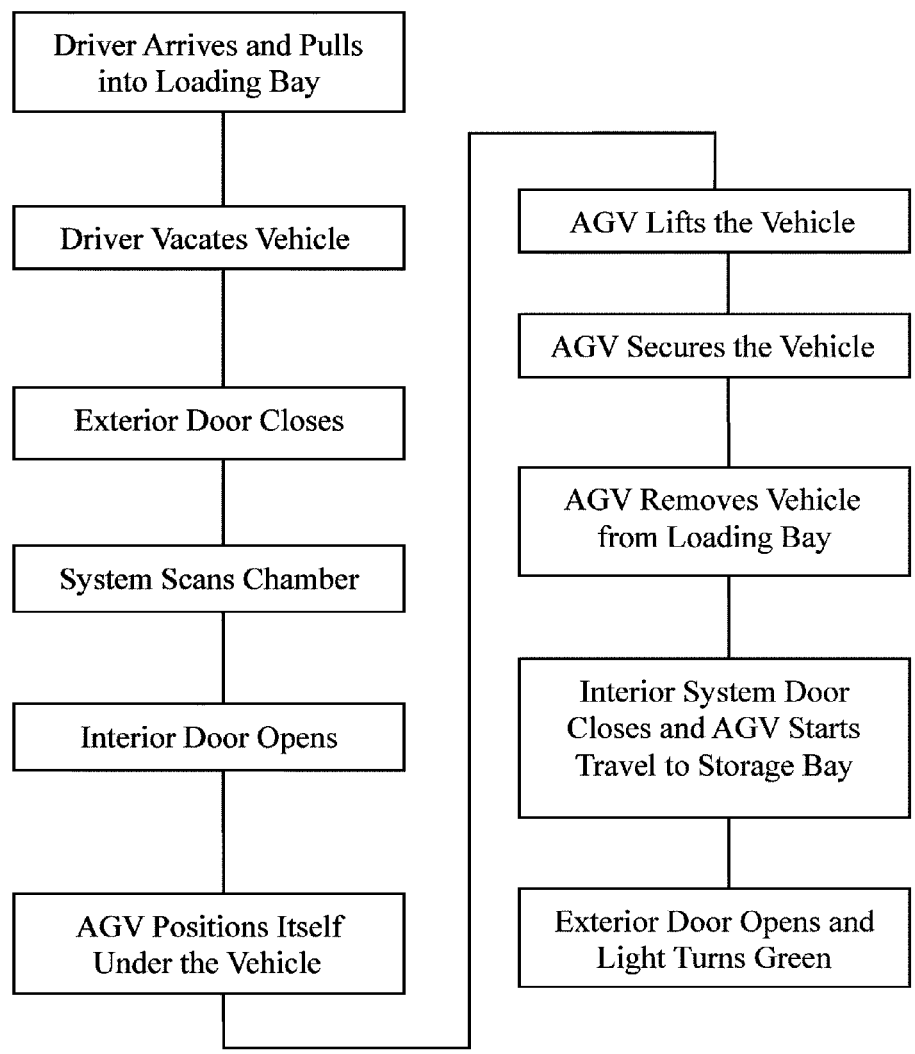
FIG. 10 illustrates a process for a loading bay cycle.
Figure 11:
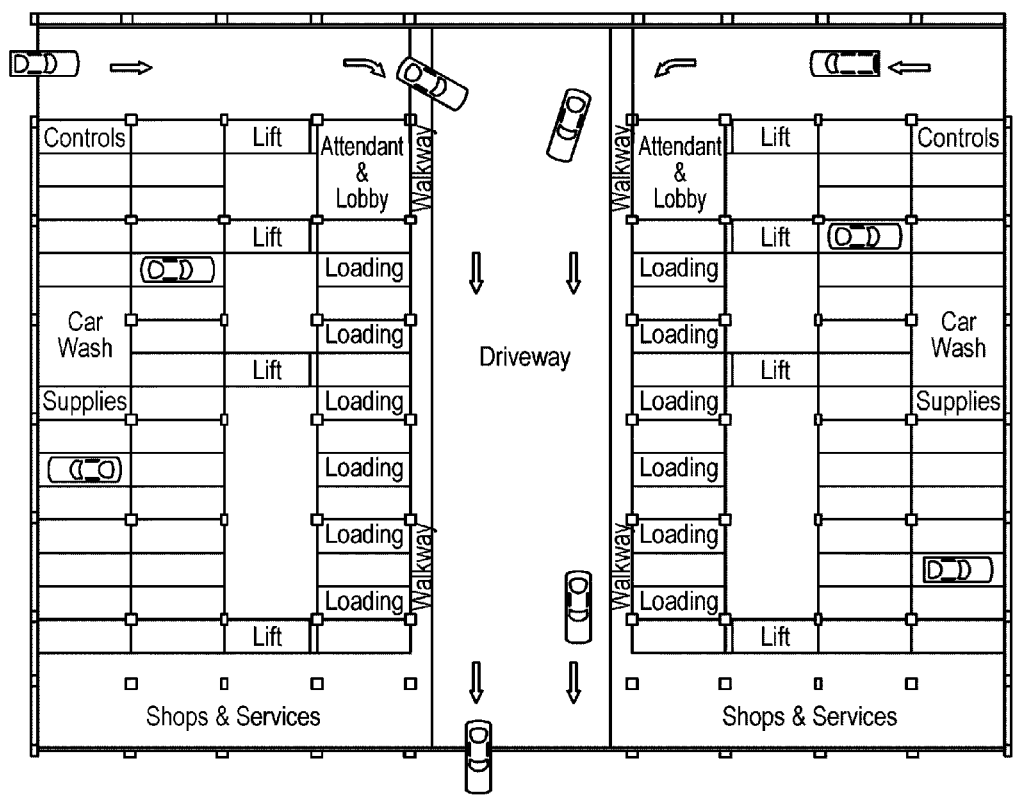
FIG. 11 illustrates one embodiment of an access scheme embodied in a ground or access floor of the automated storage facility.

FIG. 10 illustrates a typical loading bay cycle where a user delivers his/her car to the storage facility. First, a driver arrives at the parking facility and pulls along a driveway and into a loading bay. The loading bay preferably has an exterior door that is accessible to the public, and an interior door that is associated with the storage bays, does not generally allow public access to the system interior. This is shown generally in FIG. 11. Thereafter, the driver vacates the vehicle and the loading bay and the exterior door closes. At this point, the driver can access a nearby control panel and arrange for a pickup time, arrange for payment, select additional services to be rendered such as a car wash, and/or preferably complete an exit checklist, one embodiment of which is shown in FIG. 12.

Once the driver has completed the checklist and the facility has accepted the vehicle for storage, the system scans the loading bay chamber to determine the type of vehicle, its position within the loading bay, etc. Thereafter, the interior door opens and an AGV positions itself under and secures the vehicle in a manner similar to that described in connection with FIGS. 7A-7G, for example, (or FIGS. 7H-7L, for example). Other approach scenarios are contemplated. A transitional panel may be located on the floor between the storage facility and the lift to ensure a flat surface for the AGV while crossing between the lift and the storage facility. Then the AGV removes the vehicle from the loading bay, the interior door closes, and the AGV delivers the vehicle to a storage bay either on the same floor of the facility or on a different floor via a lift or some other means of vertical transport. Once the interior door closes, the loading bay is ready and available to accommodate another car to be stored.

Figure 13:
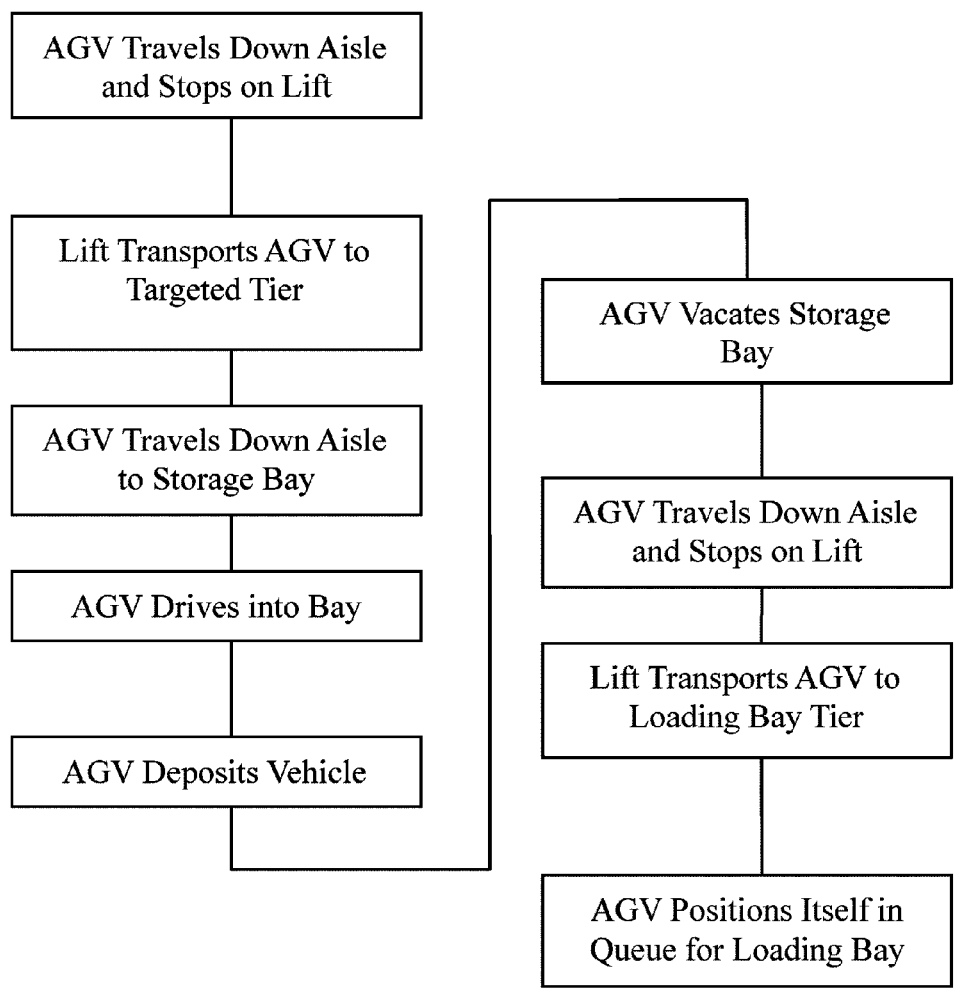
FIG. 13 illustrates a process for a vehicle storage cycle.

FIG. 13 illustrates one embodiment of a vehicle storage cycle. Initially, the AGVs could be stored in a variety of locations, such as the ground access floor or tier, or a storage tier on a different level from the access tier. Alternatively, an AGV may be housed in a charge bay somewhere in the facility in order to recharge its onboard batteries. The location of any given AGV in the automated storage facility may also be dependent on the last assignment of such AGV. For example, if the AGV was assigned to deliver a car from a storage bay to an access or loading bay for return to its owner, the AGV may be situated directly behind the access bay until instructed otherwise by the facility control system. Similarly, if the AGV just delivered a vehicle to the fifth floor of the facility, then such AGV may be situated on the fifth floor until further notice.

In any event, returning to FIG. 13, once the AGV has a vehicle loaded thereon, it travels down an aisle in the facility and either deposits the vehicle in a storage bay on the same tier, or the AGV enters a lift and the lift transports the AGV and vehicle to a targeted tier. Once on the targeted tier or floor, the AGV travels down an aisle to a storage bay and drives into the storage bay with the vehicle loaded thereon. Thereafter, the AGV disengages from the vehicle, transitions into the Compact Movement mode and vacates the storage bay. The AGV then travels to where it is needed next. In one embodiment, the AGV could backtrack to the lift, then onto the loading bay tier, then into position in queue for a loading bay.

Figure 14:
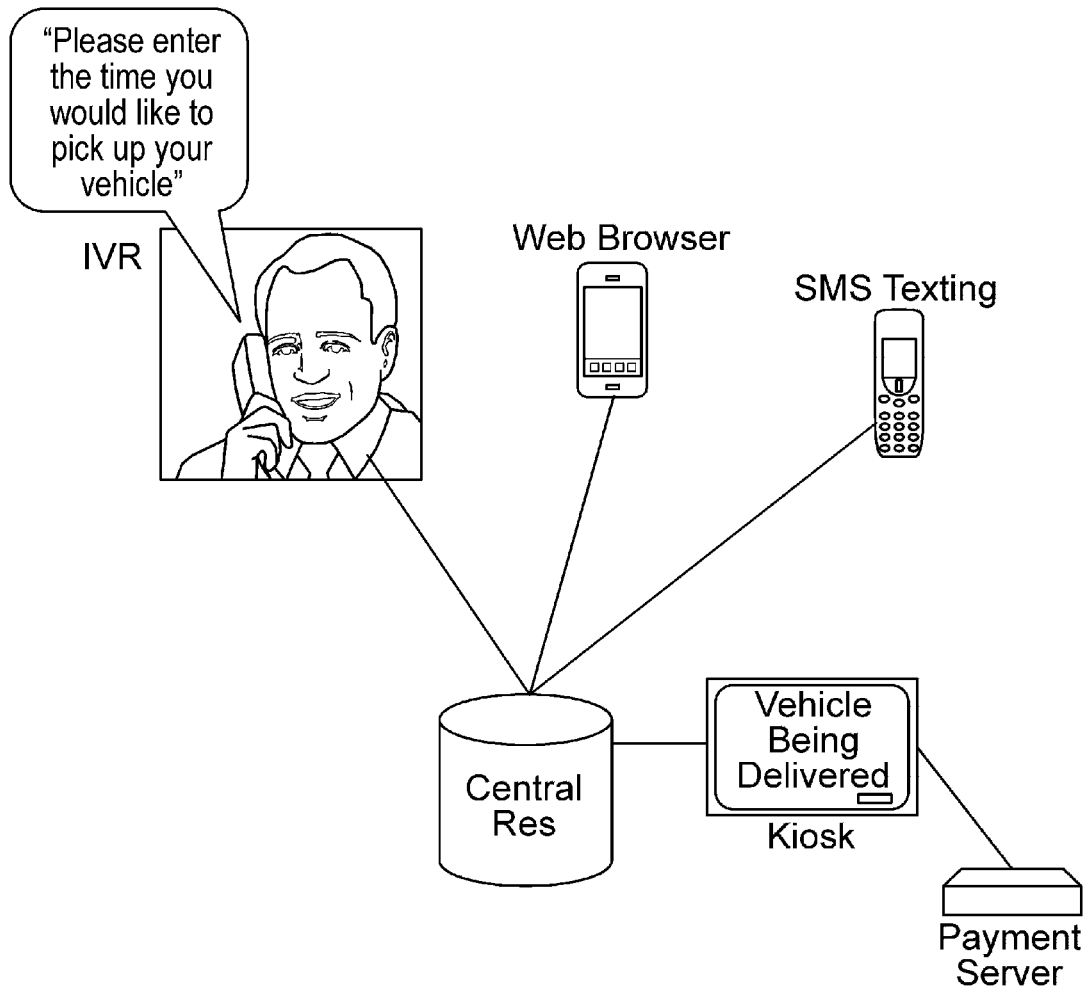
FIG. 14 illustrates a variety of different interfaces usable with the automated system of the invention.

As noted above, once a user desires to retrieve his/her vehicle from the storage facility, the user can interface with the system 100 through, for example, a graphical user interface (GUI), an interactive voice response (IVR) interface, a web browser, SMS text messaging, and the like, enabling the user to access information about his/her vehicle, pay for parking and/or other services, check balances, provide retrieval instructions, etc., as shown for example in FIG. 14. The computing device 160 (FIG. 1) then executes a process for retrieving the vehicle from its parking location to an access location to be ready for the user at the requested time. With this aim, the computing device 160 accesses a database used to store the parking location of the vehicle, computes a path from the current location to the access location and communicates the path to the AGV assigned to retrieve the vehicle. The computing device 160 also computes the amount due for payments, where payments are made through a payment server onsite or remotely.

As compared with a self-park facility, certain benefits are achieved through the use of the automated storage system of the present invention, some of which are highlighted in the following table:

| SELF PARK | AUTOMATED |
| --- | --- |
| Wasteful with space and materials | Efficient with space and materials (~50% less) |
| Cars emit exhaust while driving in garage | Cars are turned off upon entering |
| Lights in all areas | No lights in storage area |
| Massive ventilation | Minimal ventilation |
| Roof deck used for parking | Roof covered with plants and solar panels |

The ability to reduce car emissions, avoid the need for massive ventilation and utilize open space for power generation, etc., demonstrates the manner in which the automated storage solution of the present invention offsets the dramatic impact that a self-park facility has on the environment and surroundings.

Consumers, developers, architects, and municipalities are frequently skeptical of automated parking facilities because they fear, for example, that: cars may fall; the system will be unable to handle peak volume; cars will be stranded; fires will be difficult/impossible to put out without catwalks; car dimensions may change over time; and that the systems are difficult, dangerous, and time consuming to maintain and repair. The automated storage solution of the present invention addresses these concerns and provides additional benefits to the facility owner and end user as follows:

Structure Agnostic: The AGV runs on any flat surface, so any material can be used to create the support structure.

System Height: The AGV includes all of its equipment in a compact chassis, so it can slide underneath any vehicle on a flat floor. This means ~98% of the clear span will be used for the vehicle instead of being used to allow clearance for the cart to slide under and lift the vehicles.

System Width/Depth (No Catwalks): Since the entire floor of each tier or level of an automated parking facility is preferably solid and flat, fire fighters can enter the structure from a fire-rated stairwell and fight the fire as they would any garage fire. This eliminates the need for installing catwalks in front and behind each row of cars as required by some cities and municipalities.

No Column Loss: The automated system of the invention can fit cars within an existing column grid, without the need for separate columns every seven to eight feet for example. This will enable architects, once given loads and vehicle clearances, to devise the most efficient flooring system possible.

Variable Dimensions: The storage area for each car need not be a uniform length, width or depth. The flat floor area will enable the designation of some areas of the garage as compact spaces with four cars between a twenty-eight foot column span, for example, and others, such as SUV spaces for example, with only three cars between a twenty-eight foot column span. This will enable much greater density than conventional self-park facilities. Of course, these dimensions are only represented here for example as other storage configurations are contemplated.

Omni-Directional Movement: Cars can easily be moved forward and backward or side-to-side, allowing the system to send the AGV on an optimal route for each job.

Five Lanes of Lateral Movement: Because the front tires of each car are preferably placed in the same location in every bay, the system will create a predictable lane for lateral movement through every row—not just a center lift aisle. This will save much time, as the AGV will not have to retreat to the center lift aisle to move laterally down to another car on the same side of the building. Again, it does not matter whether there are cars in the spaces or not—the AGV will move freely from side-to-side.

Move Cars Around Lifts: By programming the system to leave three empty spaces around one side of each center lift, the AGV can quickly move around any busy or disabled lift shaft. Safety rails could protect cars from ever falling into the lift shaft during this or any other movement.

Moving Cars Between Systems: Until now, cars in abutting tandem parking systems must deliver cars to the loading bays serviced by each system's respective lifts. With the use of the AGV of the present invention, the automated system can retrieve any car parked anywhere within any physically connected system and bring it back to any loading bay within the interconnected system—provided there is a minimum pathway or clearance between systems.

Irregular Storage Positions: Historically, automated storage systems must place all the cars in a uniform direction determined by the access points to the storage structure. This meant that irregular building shapes that did not fit within the main system footprint, or that were inaccessible from grade were not utilized. The use of the AGV of the present invention enables cars within the same system to be parked in a parallel, perpendicular, or even at an angular position relative to the main lift aisle, provided that there is an appropriate pathway adjacent to the irregular storage area and that an appropriate guidance system is established for maneuvering through the irregular storage area.

Remote and Irregular Loading Bays: Because each AGV is self-propelled and maneuverable, the loading bays can be located outside the main storage area as long as there is a sufficient passageway to permit two AGVs to pass each other on their way back and forth from the storage area. Remote Loading Bays could also be provided without room to pass if the situation merits. Loading bays can even be located at an angle or around a curved line as long as the AGV has clear access to the area.

Adjust Throughput Easily: The use of several or more AGVs, which can be easily added to the system of the present invention when needed, can significantly improve the sub-par retrieval times of conventional systems.

Mechanical Simplicity: All of the mechanical and electrical parts of the present invention are confined to the lift, loading bays, control room, and the AGV.

Easy Repairs: The ultra-compact AGV can be rolled to an out of the way empty parking space, jacked up and worked on by hand or lowered down the lift to a separate small "workroom." The AGV can also be lifted onto dollies and manually towed out of the garage by one person using a simple towrope. Replacement AGVs are easily wheeled off a truck onto the loading bay, added to the system, and "set free" to park or retrieve cars as needed.

Retrofit Existing Garages: Select garages and warehouses can be retrofit with the AGV system as long as the floors are capable of accommodating the movement of the AGV and lifts can be installed to replace ramps.

Versatility: By welding "tire-shaped" footings to the bottom of storage lockers such as would be used in self-storage facilities, the AGV can be configured to retrieve those lockers from any storage space just as if they were cars.

No Hydraulics: Preferably loads will be lifted through the direct force of servo motors bringing the AGV arms together underneath the object, thereby, lifting cars smoothly without the use of bulky, costly, and less-reliable hydraulics.

Manual Car Retrieval: In the unlikely event that all of the AGVs cease to function at once, stranded cars can be lifted manually and rolled to the lift using hydraulic tire dollies found in most valet garages to get in and out of tight spaces without starting the car.

Consumer Peace of Mind: Since cars will never be more than approximately two inches above the floor of the garage or elevator while being transported by an AGV, consumers will have no cause for concern that their car may end up falling to an untimely demise.

While the present invention has been described at some length and with some particularity with respect to the several described embodiments, it is not intended that it should be limited to any such particulars or embodiments or any particular embodiment, but it is to be construed with reference to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. A storage system comprising:
   at least one transport vehicle having a plurality of sensors;
   a grid of guide strips installed in a floor for the transport vehicle to align its path by sensing the position of a guide strip relative to the transport vehicle, wherein a radio frequency identification (RFID) circuit is installed in an intersection of two guide strips on the grid of guide strips;
   a computing device for generating signals to control the movement of the transport vehicle; and
   a radio modem for receiving radio signals generated by the RFID circuits and the sensors and for modulating data signals generated by a computing device into radio signals and transmitting the radio signals to the transport vehicle.

2. The system of claim 1, wherein the computing device computes a path for moving the transport vehicle from the access location to the parking location and from the parking location to the access location based on a current location of the transport vehicle.

3. The system of claim 2, wherein the current location of the transport vehicle is determined by the RFID circuit and the sensors.

4. The system of claim 3, wherein the sensors keep the transport vehicle aligned along a path by sensing the position of a guide strip in the grid in relation to a center of the transport vehicle.

5. The system of claim 1, wherein each of the guide strips is either a RF wire or magnetic strip.

6. The system of claim 1, wherein a user can access the computing device with at least one of: graphical user interface, an interactive voice response interface, a web browser, or a cell phone.

7. The system of claim 1, wherein an automobile is mounted on the transport vehicle and is positionable both parallel and perpendicular to an approach direction, or both parallel and perpendicular to the direction that said automobile was brought up in a lift within the storage facility.

8. The system of claim 7, wherein the payload or automobile can be stored at angles other than parallel or perpendicular to the direction raised on the lift, including along a curved interior space.

9. The system of claim 1, wherein the transport vehicle is movable in any direction.

10. The system of claim 1, wherein the transport vehicle can enter and exit from a lift within the storage facility with its payload from any side of the lift.

* * * * *